(12) United States Patent
Schroeder et al.

(10) Patent No.: US 8,869,681 B2
(45) Date of Patent: Oct. 28, 2014

(54) COOKING PAN WITH A SHELF

(71) Applicants: Otto Schroeder, Mineola, NY (US); Annette Gucciardo, Mineola, NY (US)

(72) Inventors: Otto Schroeder, Mineola, NY (US); Annette Gucciardo, Mineola, NY (US)

( * ) Notice: Subject to any disclaimer, the term of this patent is extended or adjusted under 35 U.S.C. 154(b) by 0 days.

(21) Appl. No.: 13/687,647

(22) Filed: Nov. 28, 2012

(65) Prior Publication Data

US 2014/0131361 A1    May 15, 2014

Related U.S. Application Data

(63) Continuation-in-part of application No. 13/176,402, filed on Jul. 5, 2011, now abandoned.

(60) Provisional application No. 61/362,392, filed on Jul. 8, 2010.

(51) Int. Cl.
| | | |
|---|---|---|
| *A47J 37/10* | (2006.01) | |
| *A47J 27/00* | (2006.01) | |
| *A47J 36/00* | (2006.01) | |
| *A47J 27/02* | (2006.01) | |
| *A47J 43/18* | (2006.01) | |

(52) U.S. Cl.
CPC ............. *A47J 37/10* (2013.01); *A47J 27/002* (2013.01); *A47J 36/00* (2013.01); *A47J 37/108* (2013.01); *A47J 27/02* (2013.01); *A47J 43/18* (2013.01)
USPC .......................................................... 99/425

(58) Field of Classification Search
USPC ......... 99/422, 425, 626 C, 444, 446; D7/354, D7/360, 361; 220/573.1, 669, 670, 672, 220/674, 912, 608, 606; 126/383.1, 385.1, 126/386.1
See application file for complete search history.

(56) References Cited

U.S. PATENT DOCUMENTS

| | | | |
|---|---|---|---|
| 1,021,425 A | | 3/1912 | Osborn |
| 1,389,908 A | | 9/1921 | Shults et al. |
| 2,204,467 A | | 6/1940 | Beatson |
| 2,230,479 A | | 2/1941 | Becher |
| 2,262,302 A | * | 11/1941 | Sinclair ........................... 99/425 |
| D151,448 S | | 10/1948 | Hallgarth |
| 3,439,603 A | * | 4/1969 | Reames .......................... 99/355 |

(Continued)

OTHER PUBLICATIONS

Twin Towers Trading, Inc., Delta Wing Pan, http://www.twintowerstrading.com/featured-products/delta-wing-pan.html, printed Aug. 10, 2011, date of last modification unknown-two pages.

(Continued)

*Primary Examiner* — Henry Yuen
*Assistant Examiner* — John J Norton
(74) *Attorney, Agent, or Firm* — Brad M. Behar & Associates, PLLC

(57) ABSTRACT

An improved frying pan configured with two surfaces/levels, the first cooking surface used to cook foods and a second surface (a convenient shelf) used to hold/store foods having a slope or pitch towards the outer perimeter of the frying pan. The storage shelf allows the user to store ingredients on the pan itself without the need for additional holding plates. The outward pitch of the storage shelf along with its ridges allows liquids such as fats and oils to drain away from the ingredients and stop them from re-entering the lower cooking surface. Therefore liquids will not combine with the food in the lower cooking surface and will not combine with other food ingredients when they are cooked.

4 Claims, 9 Drawing Sheets

(56) References Cited

U.S. PATENT DOCUMENTS

| | | | |
|---|---|---|---|
| D244,827 S | 6/1977 | Nevai | |
| D249,924 S | 10/1978 | Fischer | |
| D259,461 S | 6/1981 | Daenen et al. | |
| D266,823 S * | 11/1982 | Martens | D7/356 |
| D272,972 S | 3/1984 | De Coster | |
| 4,462,388 A * | 7/1984 | Bohl et al. | 126/390.1 |
| D296,647 S | 7/1988 | Carman | |
| D346,725 S | 5/1994 | Kolada | |
| 5,441,344 A | 8/1995 | Cook, III | |
| 5,511,466 A * | 4/1996 | Dzibinski | 99/339 |
| D412,448 S | 8/1999 | Bentson | |
| 5,967,024 A * | 10/1999 | DeMars | 99/425 |
| 5,992,676 A | 11/1999 | Tsai | |
| 6,129,344 A | 10/2000 | Yang | |
| 6,196,120 B1 | 3/2001 | Reames | |
| 6,360,654 B1 * | 3/2002 | Cornfield | 99/339 |
| D458,798 S | 6/2002 | Kellermann | |
| D458,804 S | 6/2002 | Reames | |
| 6,439,110 B1 * | 8/2002 | Lin | 99/425 |
| 6,446,544 B1 | 9/2002 | Creighton | |
| 6,526,875 B1 * | 3/2003 | Dzbinski | 99/339 |
| D503,313 S | 3/2005 | Shamoon | |
| 6,990,893 B2 * | 1/2006 | Cheng | 99/422 |
| D514,764 S | 2/2006 | Kumagai | |
| D526,541 S | 8/2006 | Repp et al. | |
| D550,036 S | 9/2007 | Holcomb et al. | |
| D558,535 S | 1/2008 | Curtin | |
| D581,747 S | 12/2008 | Repp et al. | |
| D584,112 S | 1/2009 | Ehrenhaus et al. | |
| D588,947 S | 3/2009 | Curtin | |

OTHER PUBLICATIONS

Norton, John J, Office Action for U.S. Appl. No. 13/176,402, Mar. 27, 2013, 6 pages.

* cited by examiner

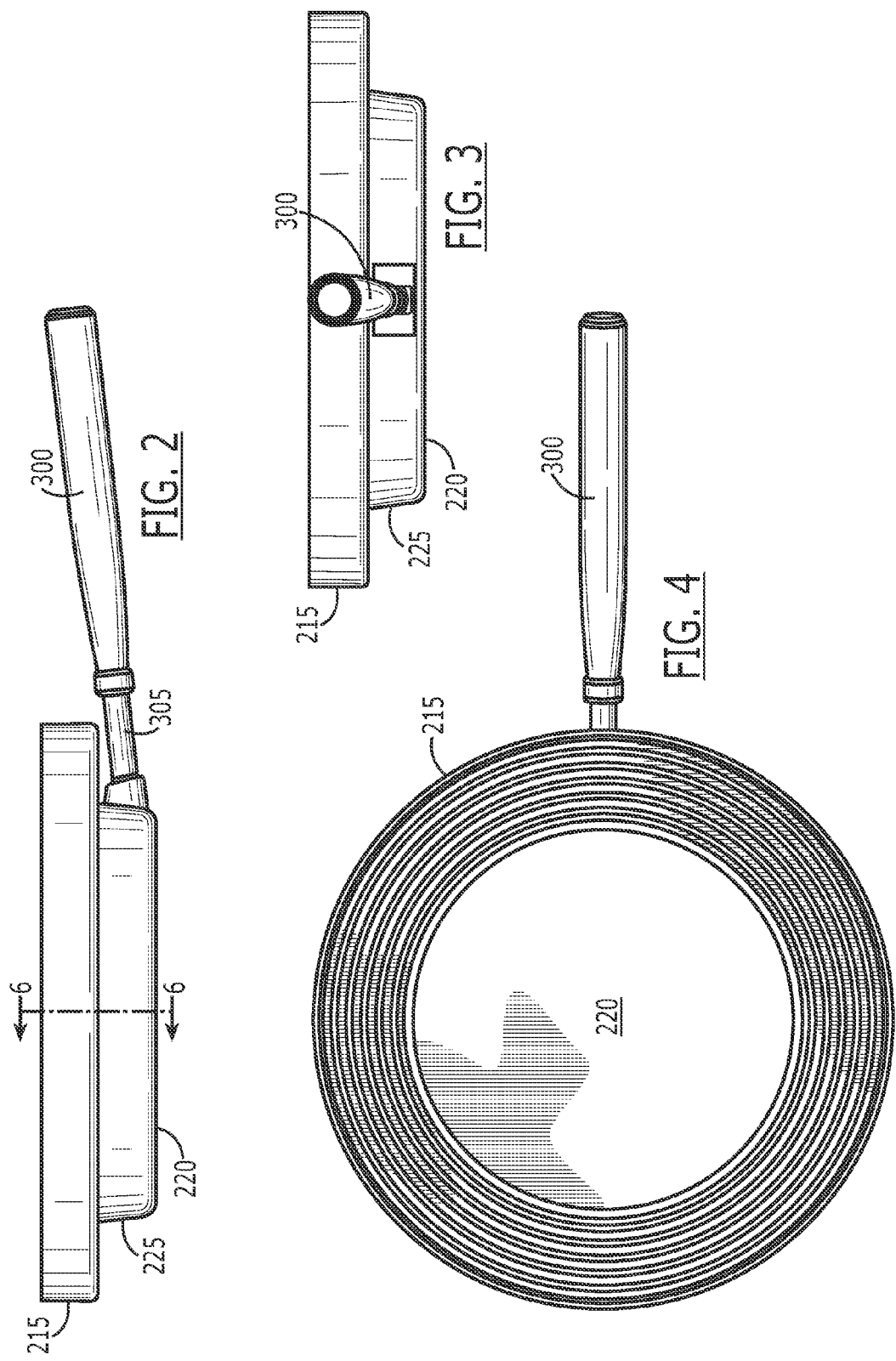

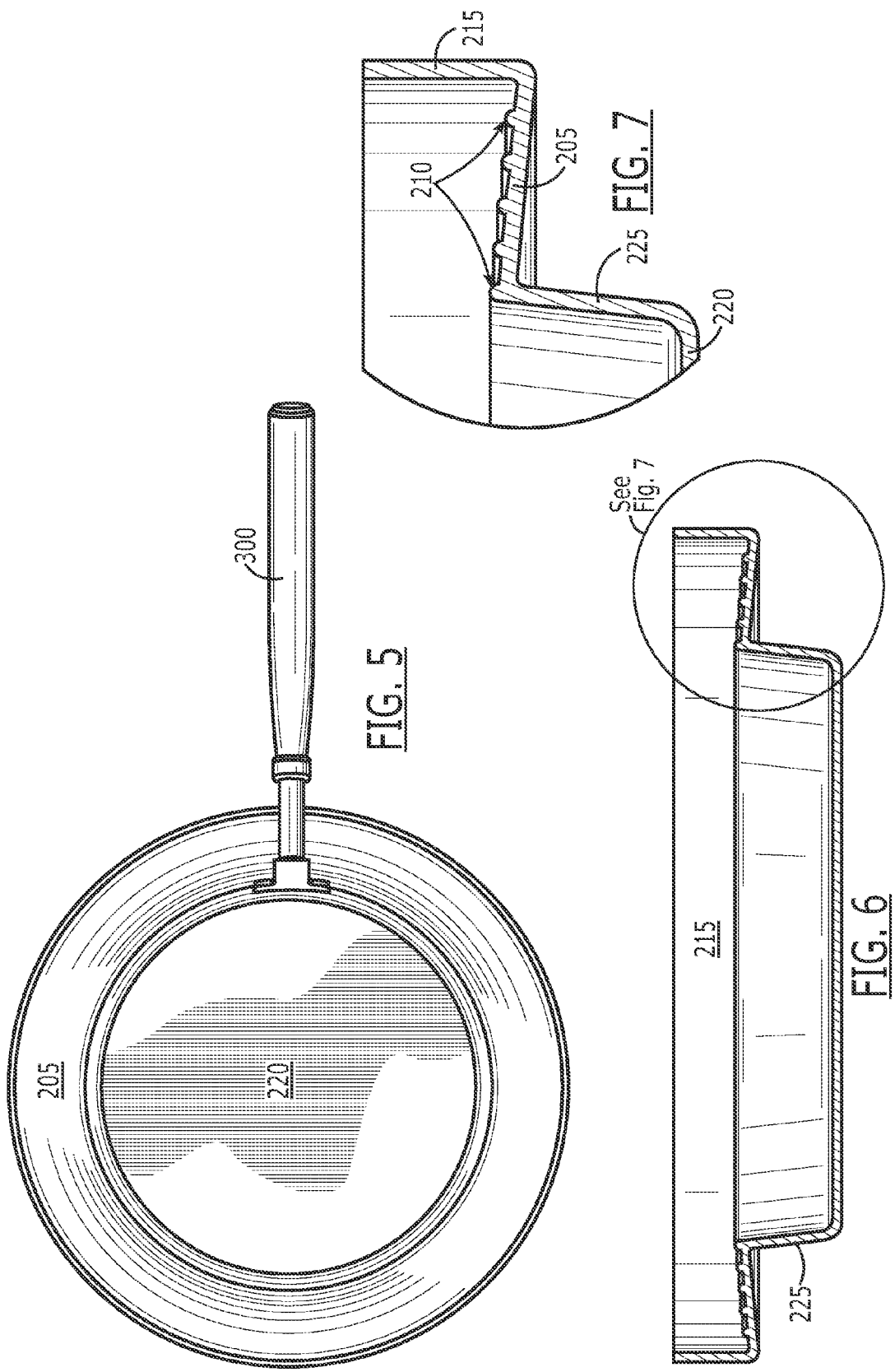

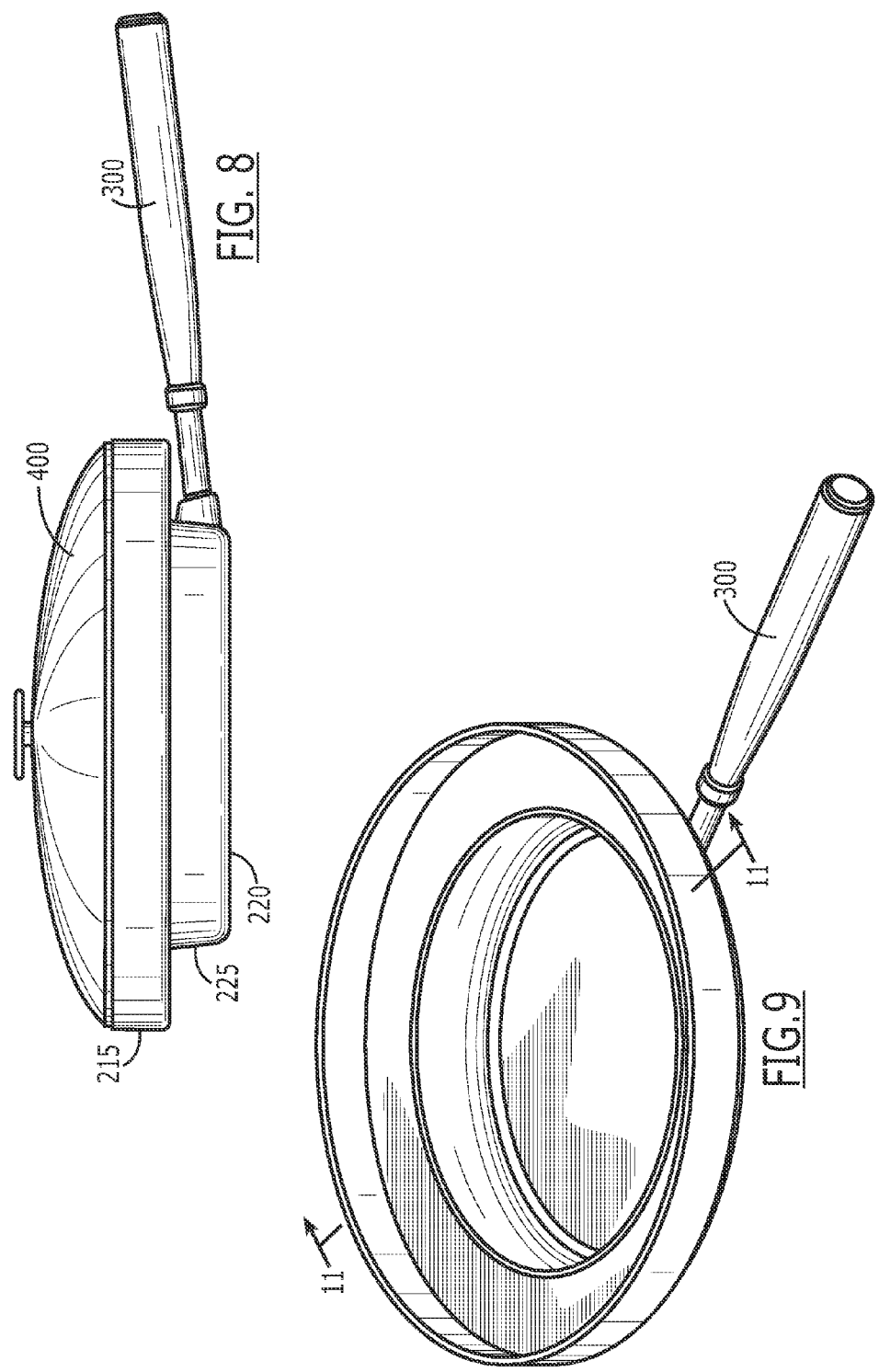

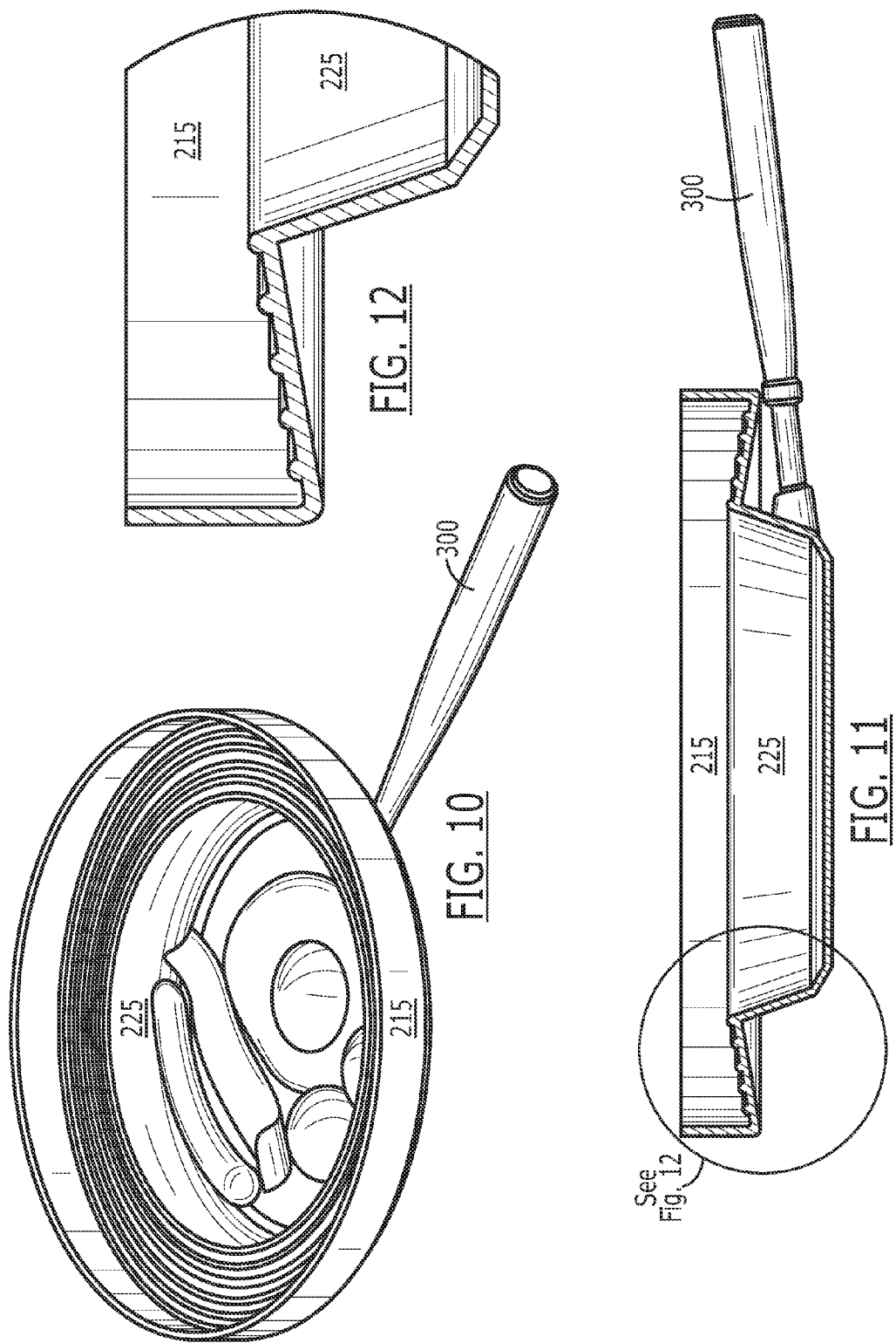

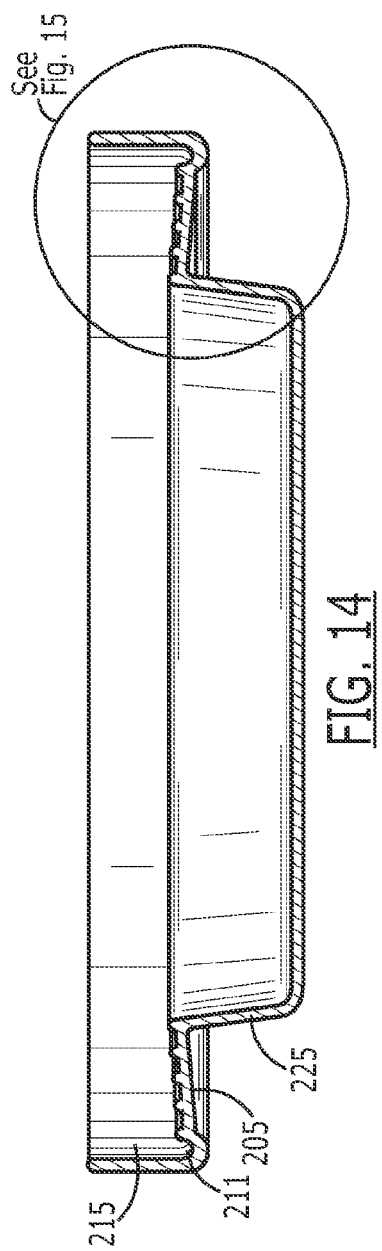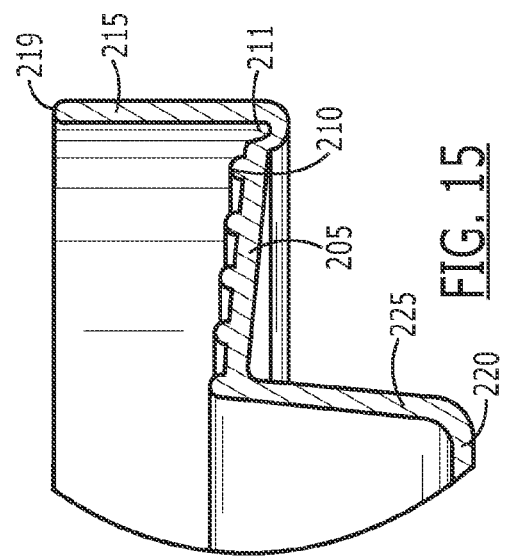

COOKING PAN WITH A SHELF

CROSS-REFERENCE TO RELATED APPLICATION

This application is a continuation-in-part of application Ser. No. 13/176,402 filed on Jul. 5, 2011 which is a non-provisional utility patent application claiming the benefit of U.S. Provisional Patent Application Ser. No. 61/362,392, filed on Jul. 8, 2010, both of which are expressly incorporated herein in their entirety by reference thereto.

FIELD OF THE INVENTION

The present invention is an improved frying pan configured with two surfaces/levels, the first cooking surface used to cook foods and a second surface (a food storage shelf) having a slope or pitch towards the perimeter of the frying pan (away from the middle) primarily used to hold/store foods. The storage shelf allows the user to store ingredients on the pan itself without the need for additional holding plates. The outward pitch of the food storage shelf allows liquids such as fats and oils to drain away from the ingredients on the shelf and stop them from re-entering the lower cooking surface during storage so that the liquids (e.g., fats and oils) do not combine with the food in the lower cooking surface and do not unintentionally combine with other food ingredients when they are cooked.

BACKGROUND OF THE INVENTION

Frying pans are popular cooking utensils because they allow the user to prepare a multitude of food dishes and to utilize various cooking techniques on foods. Specifically, frying pans can be used to sauté, braise, sear, fry, brown and even grill foods. The same food may be subjected to multiple cooking techniques in sequence and/or the different food ingredients may be cooked differently. Many food dishes require the user to cook various ingredients in stages using the same or different techniques and to then combine all the ingredients at the end of the cooking process. This segmented cooking process creates the need for additional plates and bowls in which to store the cooked ingredients until all of them are finally combined. As a result, more dishes and plates need to be cleaned after cooking, more pans or cooking bowls are needed to keep the food warm, and space is sometimes limited. Sometimes it is also desirable to keep certain fats and oils used to prepare or cook individual ingredients separate and apart from other foods or the final food product.

Frying pans are generally round or circular in shape and are commonly constructed of steel, cast iron, aluminum, copper, or other metals. Many frying pans also feature a non-stick coating to help prevent foods from sticking to their cooking surface. Most often, a pan has a flat cooking surface (base) that rests on the stove burners surrounded by a side wall around the entire circumference that helps keep the food in the cooking area. One or more handles are usually incorporated into the pan, typically connected to the side wall providing a means to hold the pan and to move and position it.

Typically, when cooking foods in a frying pan some form of lipid is introduced into the pan such as oil, lard, butter and/or margarine. Foods that are themselves fatty or oily in nature, such as bacon, would require much less or even no lipids when being cooked. In addition to acting as a lubricant between the pan and the foods, the lipids add flavor and may help decrease the overall cooking time of the food. Although the added lipids offer many benefits, they also come with some drawbacks. The fat and cholesterol content of the food being prepared increases in proportion to the amount of lipids used when preparing the food. Sometimes, it is therefore beneficial and/or desirable to minimize the amount of lipids in the final food product.

Oftentimes when cooking foods and preparing food dishes, the foods are cooked separately and then combined in the end. One reason for this is that the ingredients and components in a single food dish may require different times to fully cook. Another reason is that the ingredients and components may need to be cooked at different temperatures or using different cooking styles. When using one frying pan and/or when in a confined cooking space, it is common to cook ingredients or components separately and to remove them from the pan to prevent overcooking and then reintroduce them at a later stage of the cooking process. Ingredients removed from the frying pan are typically placed on a separate plate, bowl, or similar holding tray until they need to be reintroduced into the pan. This requires additional plates while cooking the other ingredients which increases time to cook as well as the cleanup effort needed. With the need for the additional plates comes the need for a larger area to prepare the food and a place to rest those plates while the user performs the rest of the cooking Also, the ingredients that have been removed from the pan may undesirably cool off which may alter the desired cooking process and/or affect the flavor of the food.

It would be very beneficial to have a frying pan with a shelf for the separation and storage of ingredients within the pan during the cooking process but outside the primary cooking surface area of the pan. A storage area that the food can easily be transferred onto and off of. Such a storage area could also be used to keep the food warm and would also help collect and drain liquids.

It is an object of the present invention to provide a pan with a primary cooking surface and a secondary storage surface all within one device.

It is a further object of the present invention to provide a pan with two cooking surfaces, one for use directly on a stove as a primary cooking surface and a second, elevated, cooking surface not in direct contact with the heat source.

It is a further object of the present invention to provide a pan with a primary cooking surface and a shelf above the primary cooking surface connected to the side wall of the base which allows for easy introduction and removal of foods onto and off of each of the two surfaces when cooking.

It is yet a further object of the present invention to provide a cooking pan device with a primary base cooking surface and a sloped shelf for foods, wherein the shelf further includes raised ridges and recesses.

It is yet another object of the present invention to provide a cooking pan with a shelf containing a liquid collection recess.

It is yet another object of the invention to provide a food preparation and/or serving device having a plurality of levels.

SUMMARY OF THE INVENTION

The present invention overcomes the foregoing and other shortcomings and drawbacks associated with currently available frying pans. While the invention will be described in connection with certain embodiments, it will be understood that the invention is not limited to those embodiments. To the contrary, the invention includes all alternatives, modifications and equivalents as may be included within the spirit and scope of the present invention.

The improved frying pan according to the present invention comprises a body and a handle although the invention includes embodiments without any handle and embodiments with a plurality of handles. The body comprises a base having a base side wall around the perimeter of the base thus forming a primary cooking area in the pan. The base is preferably circular but may be other shapes such as rectangular, oval and/or irregular shapes. The upper surface of the base comprises the primary cooking surface and the lower surface is intended to be placed on and in contact with the heat source, e.g., the burners on the oven or the stove. The pan according to the present invention further includes a shelf beginning at the top of the base side wall and extending outward from the perimeter of the base wall. The shelf has un upper surface intended for use as a cooking surface and/or for food, and a lower surface. The inside (innermost) portion of the shelf is connected to the top of the base side wall. Accordingly, the inside perimeter of the shelf is above the base and not in direct contact with the heat source when the device is placed on the heat source.

The shelf extends outward from the base side wall, preferably with a downward pitch away from the middle of the device (the inner perimeter of the shelf). The slope of the shelf helps to keep food from sliding into the base area of the device (the primary cooking area). The slope also helps to keep oils, fats and other liquids, including water, that accumulate on the shelf, out of the base area. The slope further helps with the collection of oils, fats and other liquids, including water, that may accumulate on the shelf and to keep them away from food on the shelf. The angle of slope can vary and although not the preferred embodiment, the food storage shelf could also be configured parallel to the base without any slope, or upward with a slope down toward the center of the device.

In one embodiment of the invention, the upper surface of the food storage shelf includes raised ridges in one or more patterns or directions to help prevent food from sticking to the upper surface of the shelf, for improved cooking, to direct liquids in a certain direction, and/or to segregate different portions of the shelf from others.

In yet another embodiment of the invention, the upper surface of the shelf includes at least one recess, e.g., a groove or channel, preferably around the outer perimeter of the shelf. A recess may be around the entire outer perimeter of the shelf and/or it may be segmented along the perimeter. The recess helps to collect oils, fats and other liquids, including water, that accumulate on the shelf and keep them away from food on the shelf. The depth of the recess on the device can be varied to hold more or less fluid.

Around the outside of the shelf is a shelf side wall similar to the base side wall. The shelf side wall extends about vertically from the outer perimeter of shelf. The shelf side wall has a bottom connected to the shelf and a top. The shelf side wall helps prevent food which is being stored on the shelf from falling out of the pan and helps to contain liquids. The top of the shelf side wall may be configured to receive and hold a cover which can be optionally used with the invention.

The accessibility of the storage shelf allows the user to store ingredients before, during, and after cooking on the pan itself without the need for additional holding plates. The outward pitch of the food storage shelf allows liquids such as fats and oils to drain away from the ingredients on the shelf and stop them from re-entering the lower cooking surface during storage so that the liquids do not combine with the food in the lower cooking surface and do not combine with other food ingredients when they are cooked.

BRIEF DESCRIPTION OF THE DRAWINGS

The accompanying drawings, which are incorporated in and constitute a part of this specification, illustrate embodiments of the invention and, together with the general description of the invention given above and the detailed description of an embodiment given below, serve to explain the principles of the present invention. Similar components of the devices are similarly numbered for simplicity.

FIG. 2 is a front view of the device shown in FIG. 1 showing the front of the body and handle.

FIG. 3 is a right side view of the device shown in FIG. 1 showing the device handle connected to the body.

FIG. 4 is a top view of the device shown in FIG. 1 showing the body and the upper surface of the base (the cooking area on the base), the upper surface of the shelf, and the handle.

FIG. 5 is a bottom view of the device shown in FIG. 1 showing the bottom surface of the body and handle.

FIG. 6 is cross section elevation taken at 6-6 on FIG. 2 showing the various levels and components of the body.

FIG. 7 is an enlarged view of a portion of the device shown in FIG. 6.

FIG. 8 is a view of the embodiment of the invention shown in FIG. 5 with a cover in place along the top of the storage shelf side wall enclosing the entire inside of the device including the primary cooking area and the shelf.

FIG. 9 is a perspective view of another embodiment of the invention comprising a body and a handle with the base side wall angled outward more than in the prior embodiment and with a rounded ridge at the top of the shelf side wall.

FIG. 10 is a perspective view of the device shown in FIG. 9 in use on a stove with food on the upper surface of the base.

FIG. 11 is cross section elevation taken at 11-11 on FIG. 9 showing the various levels and components of the device, including the angles of the various components.

FIG. 12 is an enlarged view of a portion of the device shown in FIG. 11.

FIGS. 14 and 15 show a cross section and an enlarged view for an alternative embodiment of the device with a recess along the outer perimeter of the shelf.

DETAILED DESCRIPTION OF THE INVENTION

Figure 1:
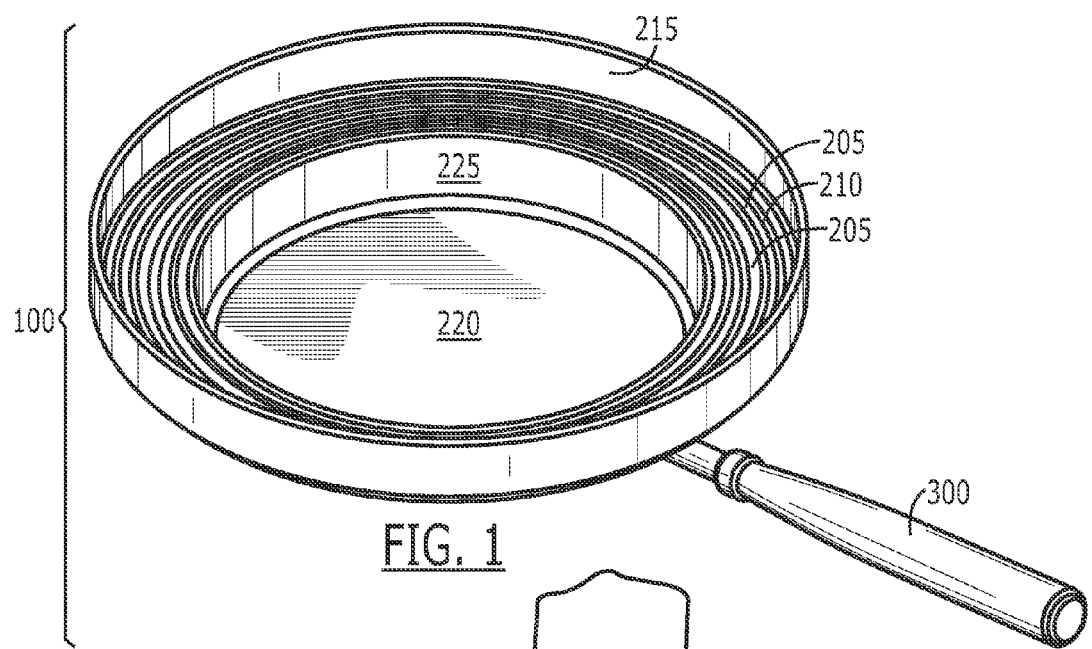
FIG. 1 is a perspective view of one embodiment of the invention comprising a body and a handle.
Figure 1A:
FIG. 1A is a perspective view of the device shown in FIG. 1 in use on a stove with food on the base and the shelf.
Figure 13:
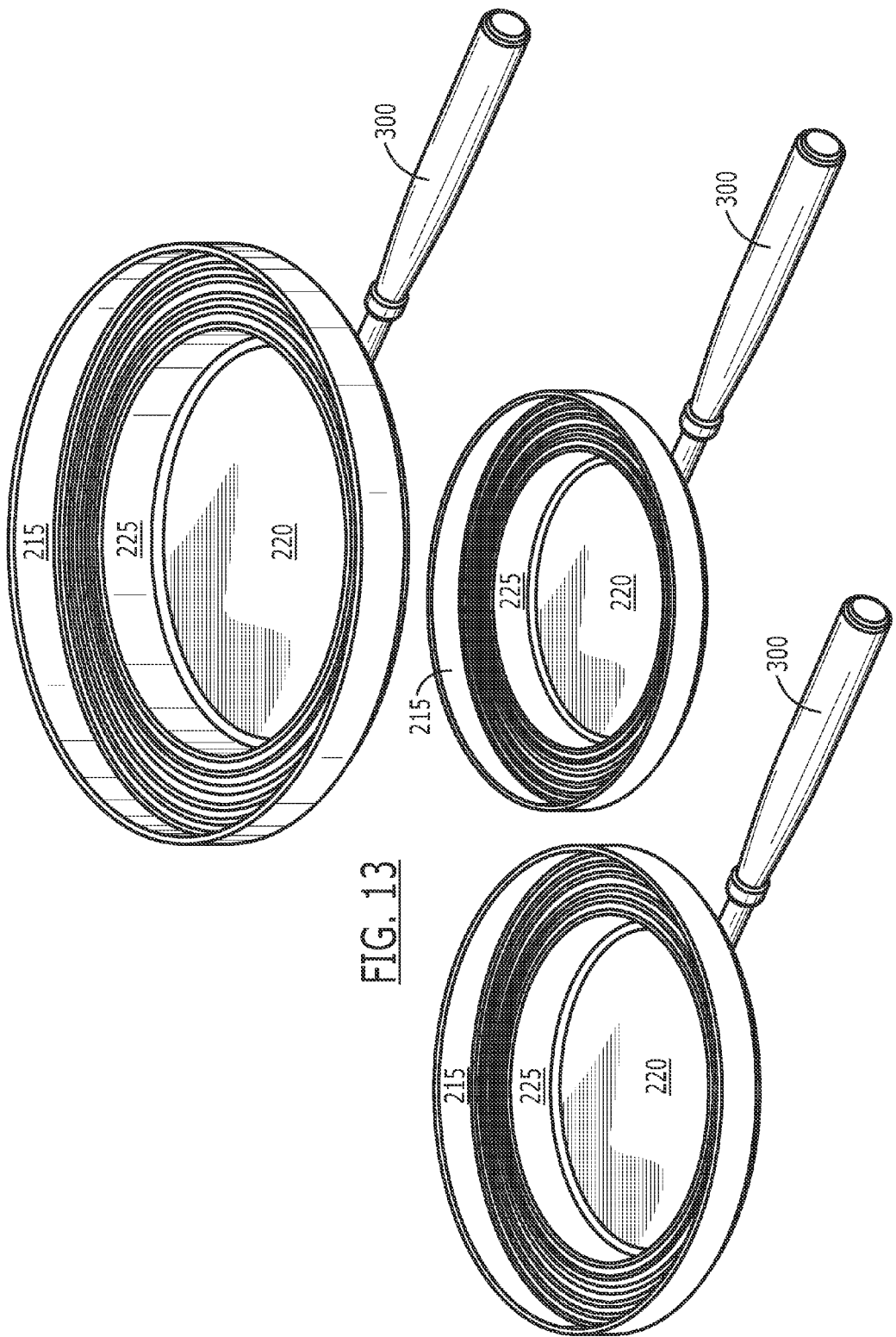
FIG. 13 shows an embodiment of the invention in multiple sizes.

One embodiment of the invention is shown in FIGS. 1-8. The present invention is a pan 100 comprising a body 200 and a handle 300. The body 200 is generally comprised of a base 220, a base side wall 225, a shelf 205, and a shelf side wall 215.

The base 220 is generally circular but may be other shapes such as rectangular, oval and irregular shapes. The upper surface of the base 220 comprises the pan's primary cooking surface. The lower surface of the base 220 is intended to be placed on the heat source surface such as the oven or stove top. The dimensions of the base 220 (e.g., the diameter, length and width, etc.) can be varied for different sized pans with varied cooking surfaces.

The outer perimeter of the base 220 has a side wall 225 which extends about perpendicularly from the base 220 (the outer circumference if the base 220 is circular) around the perimeter of the base 220. The transition between the base 220 and the side wall 225 can be abrupt forming an edge, a tapered surface, or can be gradual such as an arch having a radius as shown in FIGS. 6 and 7. In the embodiment shown in FIGS. 1-8, the side wall 225 is angled with respect to the base 220. The height of the side wall 225 can vary from one embodiment to another. The side wall 225 height may be selected based upon the overall size/dimensions of the pan and the desired volume inside the base and side wall 225. The side wall 225 has an inner surface and an outer surface, the inner surface being in contact with the upper surface of the base 220 and the side wall 225 outer surface being in contact with the lower surface of the base 220. In one embodiment for an 8½ inch diameter pan, the height of the side wall 225 is approximately 1¼ inches tall. Preferably, the height of the side wall 225 is uniform along the perimeter of the pan, although in different embodiments of the invention, the height of the side wall 225 can be varied at different points along its length. The side wall 225 encloses the internal (primary) cooking surface of the pan, preventing food which is being cooked from easily exiting the pan.

Heat radiates through the pan base 220 to the side wall 225 heating the side wall 225. When sufficiently heated, the side wall 225 also increases the pan's overall cooking surface area. Preferably, for a circular pan, the pan side wall 225 is gradually sloped away from the pan base 220 as shown in FIGS. 6 and 7 so that the circumference of the circle formed by the top of the pan side wall 225 is slightly larger than the circumference of the pan base 220. In one embodiment, the angle between an axis perpendicular to the base 220 and the side wall 225 is approximately seven degrees (7°). The pan side wall 225 could also be configured at a variety of other angles either toward or away from an axis perpendicular to the base 220.

Attached around the top of the side wall 225 is a shelf 205. The transition between the side wall 225 and the shelf 205 is preferably a smooth curved/rounded transition for ease with sliding food and ingredients between the pan's primary cooking surface on the upper surface of base 220 and the shelf 205. In the embodiment shown in FIGS. 1-8, the inner perimeter of the shelf 205 at the transition with the side wall 225 includes a raised lip or ridge 210 to help keep food placed on the shelf 225 from sliding down onto the base 220. The ridge 210 at the transition between the side wall 225 and the shelf 205 also helps keep liquids on the shelf 205 from draining down onto the base 220.

The shelf 205 has an upper surface, where food is stored, and a lower surface. The upper surface of the shelf 205 is connected to the inside surface of the side wall 225 and the lower surface of the shelf 205 is connected to the outer surface of the side wall 225 The food storage shelf 205 extends outward from the side wall 225 away from the middle of the base 220 and away from the side wall 225, preferably with pitch downward away from the top of the side wall 225. In the embodiment shown in FIGS. 1-8, the shelf 205 slopes away from (down from) a horizontal axis or plane at the top of the side wall 225, at an angle of approximately five degrees (5°). The shelf 205 could also be configured so that it is perpendicular to the pan side wall 225 without any downward angle or can also be sloped at a variety of other angles either above or below the top of the side wall 225. The width of the shelf 205 according to one embodiment of the invention for a 12 inch pan having an 8½ inch base is approximately 1½ inches in width. When the pan 100 is placed on a stove or oven and heated, the heat from base 220 radiates through the side wall 225 and the shelf 205 providing an additional cooking surface or warming surface for the pan 100. The heat applied can be varied to increase or decrease the resulting temperature on the shelf 205.

Figure 16:
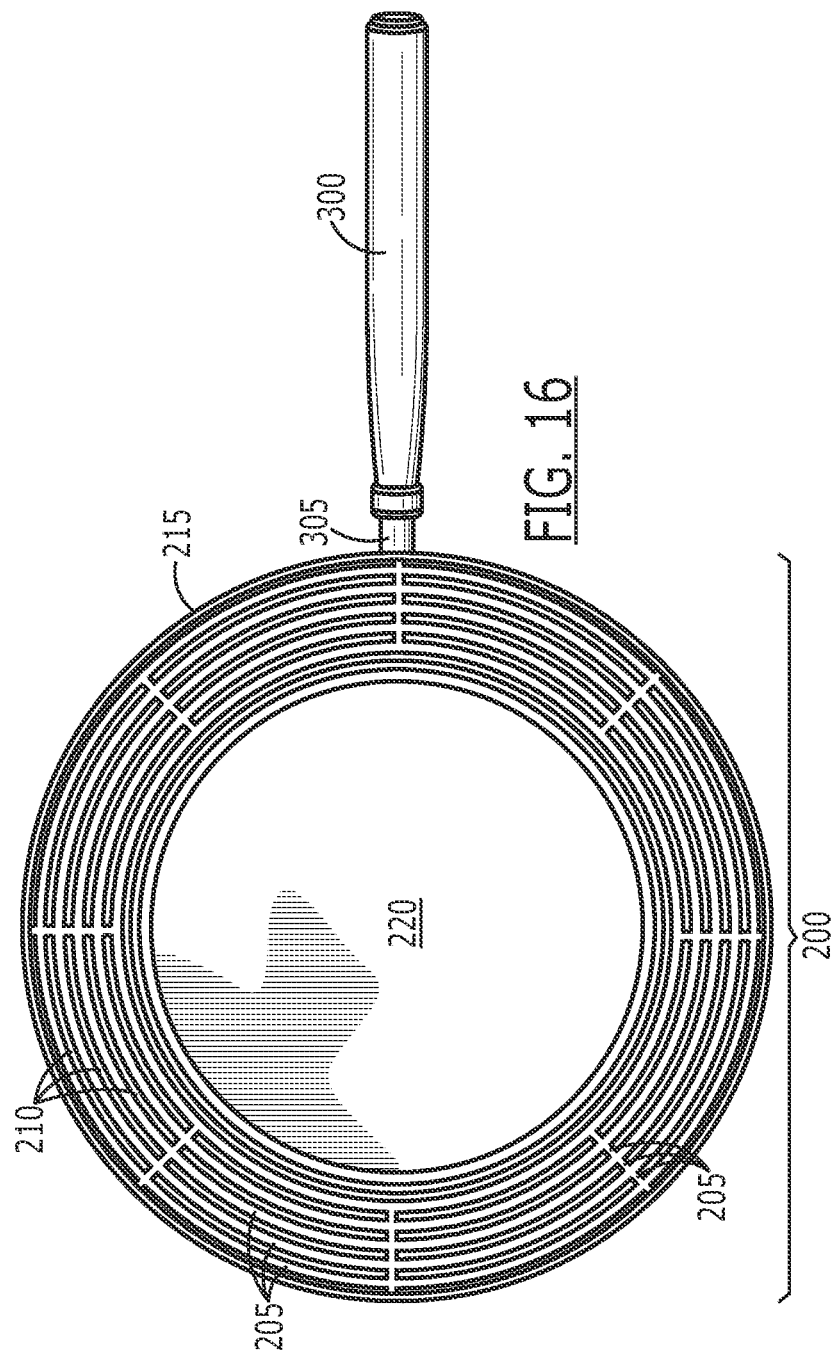
FIG. 16 is a top view of another embodiment of the device showing an alternative ridge configuration on the shelf.

The upper surface of the shelf 205 may also have one or more ridges 210 to reduce surface contact between the upper surface of the shelf and food (to reduce heating and cooking on the shelf) and/or to direct liquids away from the side wall 225 and the base 220. In one embodiment of the invention, the upper surface of the shelf 205 has one ridge 210 around the inner perimeter of the upper surface of the food shelf 205 (see FIG. 9). In another embodiment, the upper surface of the shelf 205 has a plurality of ridges. For example, in the embodiment shown in FIG. 1, shelf 205 has five (5) equally spaced circular ridges 210. In an alternative embodiment, the ridges 210, except for the innermost ridge, do not extend around the entire circumference of the shelf leaving areas without the ridge at like positions for the ridges with respect to each other (or at alternating positions) so that liquids may drain away from the side wall 225 and the cooking area on base 220 toward the outer perimeter of the shelf 205 as shown in FIG. 16. The ridges 210 also help keep the food that is being placed thereon from sliding around on the shelf 205 and/or down onto base 220. The ridges 210 also decrease the surface area contact between the food and the upper surface of the shelf 205. The ridges 210 further function to make movement of food on the shelf 205 easier. Since the heat from a stove or oven radiates upward throughout the base 220 and side wall 225 and shelf 205, the ridges 210 reduce the amount of additional cooking of the food stored on the shelf 205.

Figure 17:
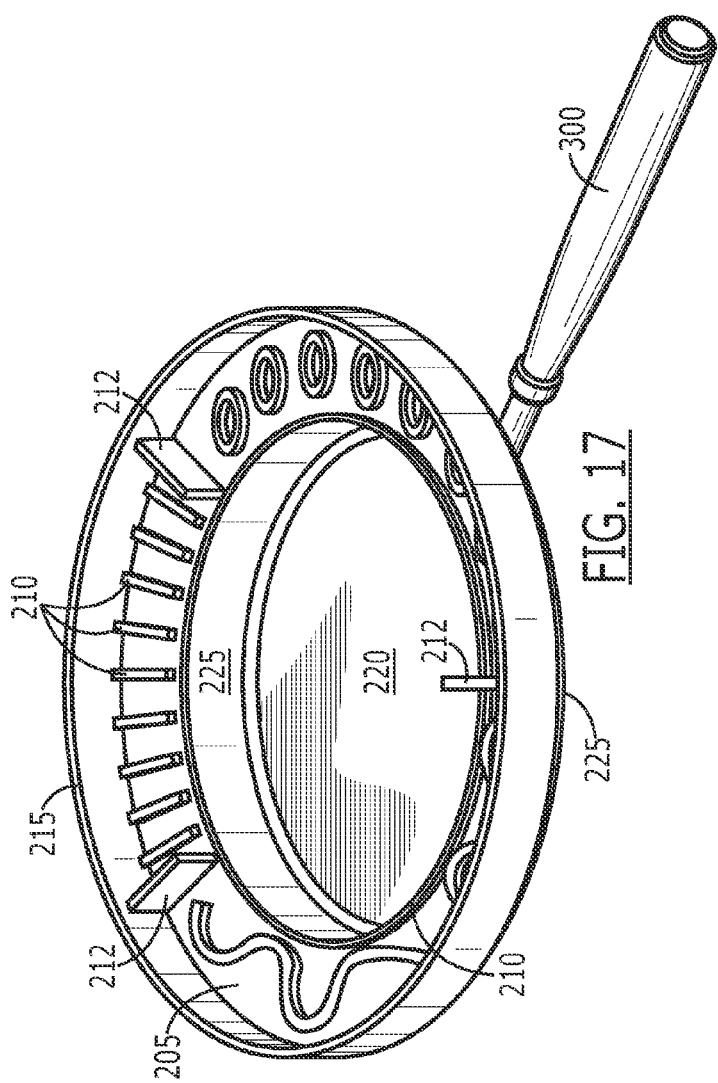
FIG. 17 is a top view of another embodiment of the device showing an alternative ridge configuration on the shelf.

In the embodiment of the invention shown in FIGS. 1-8 for a circular pan base 220, each consecutive concentric ring formed by the plurality of ridges 210 on the shelf 205, starting from the inner perimeter of the shelf 205 is slightly larger in diameter than the one ridge immediately preceding it. The one or more ridge(s) 210 can be approximately ⅛ inches in height above the shelf upper surface, although the specific height of each ridge can be varied from one pan to another and also within a single pan. The shelf 205 and the pan 100 can also be made with more or less ridges than the embodiments shown in the figures, with spiraling ridges or with other ridge designs as shown in FIG. 17, or without any ridges. The ridges 210 can be configured diagonally, in a zigzag formation, or in various shapes as shown in FIG. 17.

The food storage shelf 205 can also include one or more partition ridges 212 extending from the innermost edge of the shelf 205 toward the outermost edge as shown in FIG. 17. In such a configuration the partition ridges 212 create different compartments on the shelf 205. The partition ridges 212 help to separate foods and keep liquids that may collect on the shelf 205 within different areas from combining with each other.

In another embodiment of the invention shown in FIGS. 14 and 15, the shelf 205 has a recess 211 in its upper surface, preferably at its outermost perimeter. The recess or channel may travel around the entire outer perimeter of the shelf 205 and/or it may be segmented or partitioned as well. In one embodiment, the recess or channel is approximately ⅛ inches in depth but other depths are possible. The recess or channel 211 is configured to capture lipids, juices and moisture from ingredients or foods being stored on the shelf 205 so that when the stored ingredients are introduced or reintroduced onto the base 220 for cooking, those liquids will not undesirably enter the primary cooking area. Most preferably, the liquids on the shelf 205 drain into and remain in the recess 211. For those embodiments with a pitch or angle for the shelf 205 towards a recess 211, the pitch and recess 211 assist with drainage.

Attached to the outside perimeter of the shelf 205 is a shelf side wall 215, similar to side wall 225 for base 220. The shelf side wall 215 extends vertically from the upper surface of the shelf 205 at the outer perimeter of shelf 205. The height of the shelf side wall 215 can vary depending on the overall dimensions of the pan 100, the size of the shelf 205, and/or based on the particular food for which the pan 100 will be used to prepare. The shelf side wall 215 has a top and a bottom. The height of the shelf side wall 215, according to one embodiment of the invention, from its top to bottom is approximately 1¼ inches tall. The height of the shelf side wall 215 may be uniform along the perimeter of the shelf 205 or it may change in height along the perimeter. The shelf side wall 215 encloses the upper surface of the shelf 205. The shelf side wall 215 helps prevent food which is being stored on the shelf 205 from falling out of the pan 100 and helps to contain liquids in the pan 100.

In the embodiment shown in FIGS. 14 and 15, the top of the shelf side wall 215 includes a rounded edge 219. The rounded edge 219 is configured to make a better contact surface for a removable pan cover 400, as shown in FIG. 8.

The pan 100 can be made of any material suitable for manufacturing frying pans, including but not limited to steel, aluminum, cast iron, copper, etc. The upper surfaces of the base 220 and the shelf 205 as well as the inner surfaces of the side wall 225 and shelf side wall 215 preferably include a non-stick coating in order to prevent the food and ingredients used from sticking to the pan 100.

Figure 18:
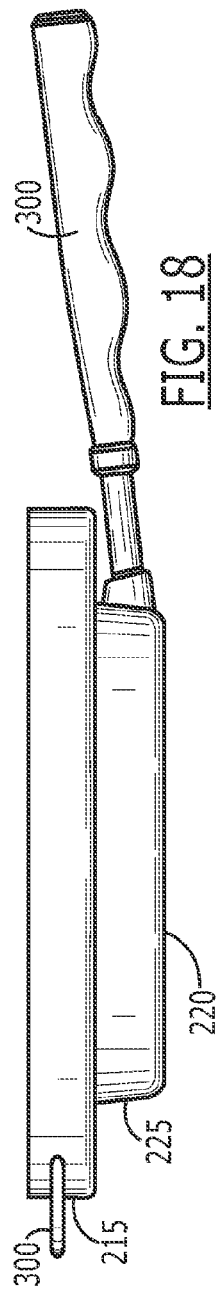
FIG. 18 is a side view of another embodiment of the device showing two handles.

A handle 300 is attached to the body 200. In one embodiment of the invention shown in FIGS. 1-8, the handle 300 is attached to the outer surface of the side wall 225 and extends outward, away from the middle of the pan 100. The handle 300, in other embodiments, can be attached to the base 220, to the lower surface of the shelf 205, to the shelf side wall 215 or to a combination of two or more of these components. As shown in FIG. 18, the pan 100 may also feature more than one handle 300. The handles can be in different configurations, including straight, curved, or circular/looped, among other possible variations. The handle(s) 300 may also be positioned at different locations on the pan 100, including for two handles, on opposite sides on the pan 100. The handle(s) 300 can be configured to be more ergonomic making them easier to grip and to hold. The handle(s) 300 can be made of any material suitable for insulating the handle from the heat, including ceramic, plastic, or any other heat resistant natural or synthetic material. The handle 300 can also be made using a combination of materials, such as, for example, being constructed using a metal core surrounded by a synthetic heat resistant exterior such as a heat resistant plastic, thereby making the handle cool to the touch even when the pan 100 is in use and exposed to heat. The handle(s) 300 may be fixed to the pan using a weld connection or a riveted connection.

We claim:

1. A pan comprising a circular base, a side wall, a shelf, and a shelf side wall;
   said circular base comprising an upper surface, a lower surface and a perimeter;
   said side wall comprising an inner surface, an outer surface, a top, and a bottom, said side wall fixedly attached to said base at said bottom of said side wall at said perimeter of said base, wherein said inner surface of said base and said inner surface of said side wall forming a surface on which to cook foods, wherein said side wall is sloped outward from said base from said bottom to said top of said side wall;
   a shelf comprising an upper surface, a lower surface, an inner perimeter, and an outer perimeter, said inner perimeter of said shelf fixedly attached to said top of said side wall, wherein said shelf comprises a raised ridge at said inner perimeter; wherein said shelf is sloped constantly downward from the top of said side wall from said inner perimeter to said outer perimeter, said shelf further comprising a recess channel within the upper surface along the outer perimeter of said shelf and ridges on said upper surface of said shelf; and
   a shelf side wall comprising an inner surface, an outer surface, a top, and a bottom, said bottom of said shelf side wall fixedly attached to said outer perimeter of said shelf.

2. The pan of claim 1 further comprising a plurality of ridges connecting said inner perimeter to said outer perimeter of said shelf creating compartments on said shelf.

3. The pan of claim 1, further comprising a cover wherein said top of said shelf side wall is configured to hold said cover.

4. The pan of claim 1, said shelf further comprising a plurality of concentric ridges on said upper surface of said shelf.

* * * * *